UNITED STATES PATENT OFFICE.

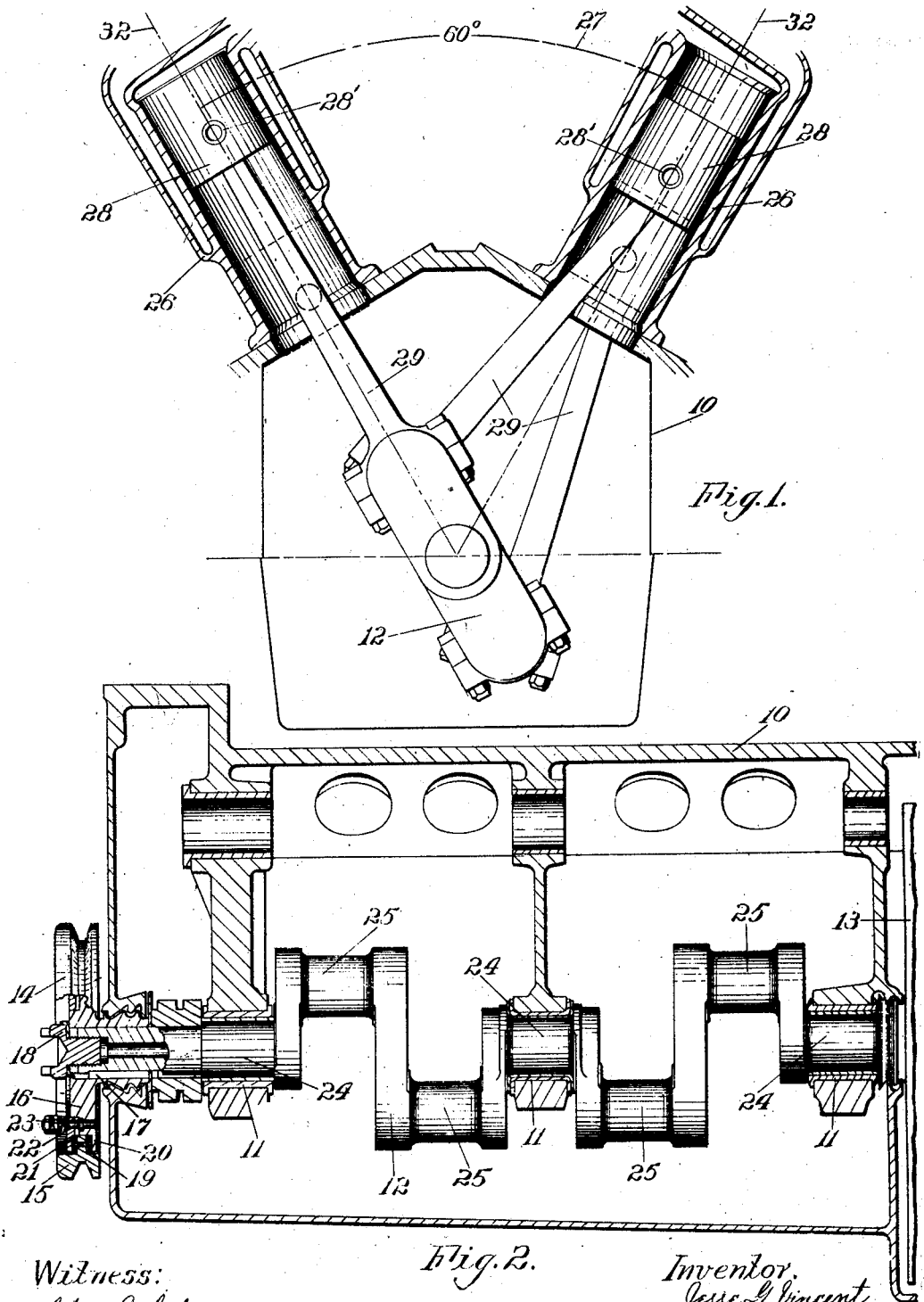

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,335,143.  Specification of Letters Patent. Patented Mar. 30, 1920.

Application filed December 6, 1915. Serial No. 65,277.

*To all whom it may concern:*

Be it known that I, JESSE G. VINCENT, citizen of the United States, and resident of Detroit, Wayne county, State of Michigan, have invented certain new and useful Improvements in Hydrocarbon-Motors, of which the following is a specification.

This invention relates to hydrocarbon motors and particularly to motors having eight, or a multiple of eight, cylinders arranged in sets of four cylinders each. As shown the motor is of the V-type, designed for motor vehicle, that is automobile, flying machine or boat use.

In four cylinder four cycle motors in which the cylinders are arranged in line, the crank shaft is usually formed with the axes of the crank pins all in one plane, which plane also passes through the axes of the main bearings of the crank shaft. The inherent lack of balance of such motors is well known, being due to the shifting of the combined center of gravity of the four pistons, vertically in a vertical motor, because of the necessary angularity of the connecting rods between the top and bottom of the strokes. In other words, such motors of the vertical type, when running, vibrate vertically regardless of the fact that they may be in perfect static balance and in perfect balance so far as relative weights of reciprocating parts are concerned.

When two such four cylinder motors are combined on one crank shaft of the form described, the two sets of four cylinders each being set at an angle of ninety degrees to each other and forty-five degrees each from the vertical, it is found, and may be readily demonstrated that the two vibratory forces of the separate blocks each tending to act in the direction of the axes of the cylinders, result in a horizontal shifting of the combined center of gravity of the eight pistons thus causing a very noticeable horizontal vibration of the motor, the degree depending of course upon various factors, particularly the speed, weight of reciprocating parts, etc.

Also, it has been found that in motors having cylinders eight in number or multiples thereof, with evenly spaced intervals between explosions, at certain speeds a periodic torsional vibration of the crank shaft takes place due to the synchronization of the oscillations of the crank shaft produced primarily by the inertia effects of the reciprocating masses, with the explosive impulses.

One of the objects of the present invention is to reduce or eliminate, or to render less objectionable, this vibration which has heretofore resulted from the inherent unbalance of an eight cylinder motor of this general type. In the present invention:

The relation of the cylinder sets is changed from the usual ninety degree angle of the planes in which their respective cylinders lie, to such an angle that the combined center of gravity of the pistons of the eight cylinders, when the motor is running, moves substantially in a circle instead of shifting in a straight line either horizontally or vertically, and so as to alter the intervals between explosive impulses and thus in conjunction with the arrangement of the axes of all the crank pins in the same plane, prevent that periodic torsional vibration.

Other objects and advantages of the present invention will appear from the following description taken in connection with the drawings, which form a part of this specification and in which:—

Figure 1 is a vertical transverse section through a motor embodying this invention;

Fig. 2 is a vertical longitudinal section through the motor shown in Fig. 1, the cylinders being removed;

Figure 3:
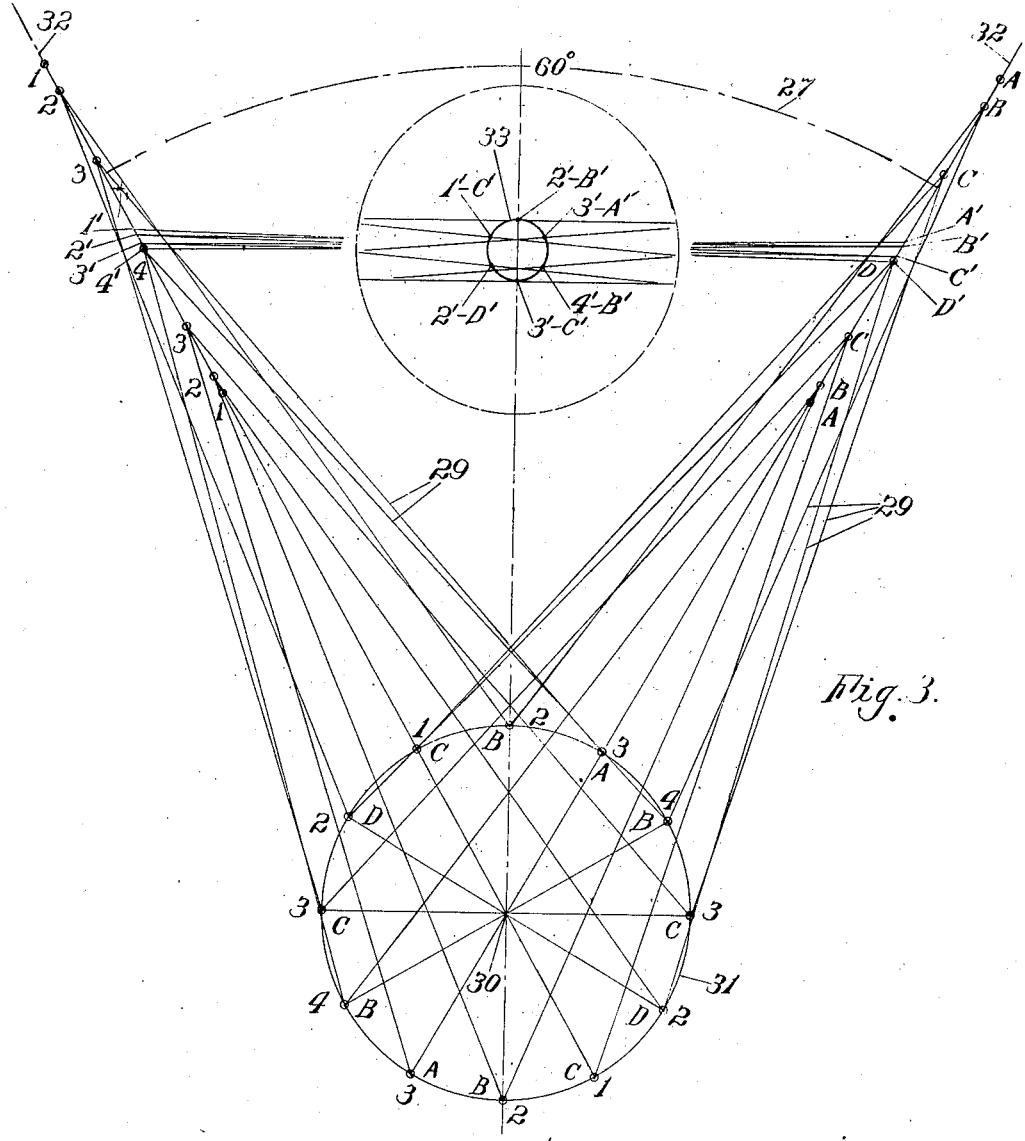
Fig. 3 is a diagram illustrating the path of travel of the combined center of gravity of the pistons, the part of the diagram within the dotted circle being enlarged.

Referring to the drawings, 10 represents the base or crank case of a motor designed according to this invention, and within this crank case are main bearings 11 in which a crank shaft 12 is adapted to rotate. At the rear end of the crank shaft is the flywheel 13, and at the forward end there is a frictionally mounted flywheel 14 which is known as a vibration damper. This vibration damper consists of an inertia member 15 which may rotate upon the periphery of a flange 16 which is keyed to the front end of the crank shaft as at 17, and secured thereon by bolt 18, which inertia member is provided with opposite friction faces 19 arranged between a friction disk 20 secured or formed integral with the flange 16, and a friction disk 21 which is yieldingly pressed toward the disk 20 as by a series of springs 22 on pins 23 extending from the flange 16 and through the disk 21. Thus the inertia member 15 is held frictionally between the disks 20 and 21, and consequently normally rotates with the crank shaft. However, if there are uneven rotary movements of the crank shaft causing a torsional or similar vibration of the crank shaft, the inertia member 15 will slip relatively to the disks 20 and 21, and thereby tend to damp out the vibrations.

Figure 4:
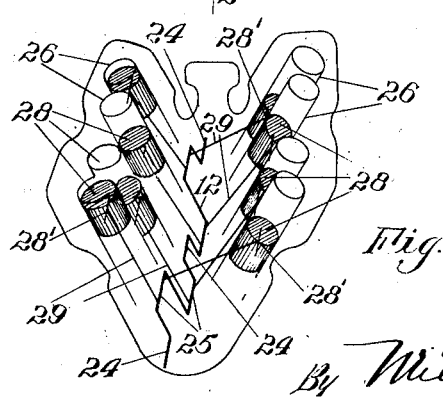
Fig. 4 is a diagrammatic view illustrating the arrangement of the crank shaft and cylinder of the motor.

The crank shaft 12 above referred to has three main bearing parts 24 which are mounted in the bearings 11, and four crank throws or crank pins 25, upon each of which two of the connecting rods of the motor have their bearing. As shown particularly in Figs. 1 and 4, the axes of these four crank pins are in a plane, which plane also passes through the axes of the main bearing parts 24 of the crank shaft.

Formed with or mounted upon the crank case 10 are the motor cylinders 26, there being two sets of such cylinders, four on the right hand side and four on the left hand side. Their axes may, if desired, be slightly staggered relatively to each other, so that the connecting rods need not be offset to connect them side by side on the crank pins 25. As shown in the drawings, the axes of each set of cylinders are in a plane passing substantially through the axes of the main bearings 11, and these planes are at an angle to each other of approximately 60 degrees. This latter is indicated by the arc 27 in Fig. 1.

In each of the cylinders 26 there is a piston 28, and connecting rods 29 connect the pistons respectively with the crank pins 25 of the crank shaft 12. It will be understood that each crank pin 25 has two connecting rods journaled on it, one from each set of cylinders.

From the above arrangement, it is evident, particularly from Fig. 1, that when all of the connecting rods 29 of one set of cylinders are directly in line, or as a matter of fact, with their longitudinal axes in the plane of the axes of the crank pins 25, the connecting rods of the other set of cylinders are at various angles, two of them making a somewhat acute angle with the crank throws and the other two making an obtuse angle therewith. In other words, by reason of the fact that the cylinders are not set at 90 degrees, the pistons in the right hand set of cylinders in Fig. 1 are not at the middle of their strokes when the pistons in the left hand set of cylinders are at the upper and lower extremes of their strokes. This arrangement, of course, produces uneven firing in the cylinders, which is, however, unobjectionable owing to the overlap of effective firing strokes due to the multiplicity of cylinders.

In the diagrammatic view in Fig. 3, the axis about which the crank shaft rotates is represented at 30, and the circle described by the axes of the crank pins 25 is represented at 31. The lines 32 are 60 degrees apart, and respectively represent the planes in which the cylinder axes lie. The axes of the crank pins are represented at various points around the circle 31 by the small circles, and similar small circles on the lines 32 represent the centers of the piston pins 28'. The lines 29 represent the connecting rods extending from the crank pins to the piston pins.

It will be understood that were it not for the angularity of the connecting rods, the piston in a given cylinder would be midway of its stroke when the crank shaft had turned 90 degrees from either upper or lower dead center, but since the angularity exists, it is evident that the piston will be somewhat below the middle point of its travel when the crank shaft is 90 degrees from upper or lower dead center. Thus, in Fig. 3, referring to the right hand cylinders only, the upper and lower letters A on the line 32, represent respectively the upper and lower limits of travel of the center of the piston pin 28', and the points marked D on the circle 31 represent the centers of the crank pins 90 degrees from dead center, the dead center points being indicated at A on said circle 31. Then by following the connecting rods 29 from said points D' on the circle 31 to the point D on the line 32, it is seen that said latter point is somewhat below the mean between the points A on said line 32, the mean between said points A being at A'. This point D' on the line 32 may be said to be the combined center of gravity of the four pistons in the set of cylinders on that side of the motor, and it will be understood of course that exactly the same situation exists in regard to the position of the pistons in the other set of cylinders on the other side of the motor. Thus, when the axes of the crank pins are at the points 4 on said circle 31, they are 90 degrees from the dead center which is on the line 32 of the left hand cylinders, and the two connecting rods reach the point 4 on said line, which point is somewhat below the mean between the upper and lower points 1 on said line 32.

But because the cylinders are set 60 degrees apart, instead of 90, the combined center of gravity of all of the pistons travels in a circle in the same direction as that of the crank shaft and twice as fast as the crank shaft. The travel of this combined center of gravity is clearly indicated on Fig.

3. Thus, if the pistons in the right hand set of cylinders are at upper and lower dead center, that is, two of them at the upper limit of travel and two of them at the lower limit of travel, these limits of travel being indicated by the points A on the line 32, the combined center of gravity of these four pistons is half way between the points A, or at A′ on said line 32. When the pistons are in this position, the four crank pins would be in the positions marked A or 3 on the circle 31, and by following the connecting rods 29 to the pistons in the left hand set of cylinders, it is found that they connect with the points 3 on said line 32. Then by dividing the distance between these two points 3, the point 3′ is obtained, which of course is the combined center of gravity of these four pistons at that time. Then by drawing a line from the point 3′ to the point A′ and dividing the distance, the point indicated at 3′—A′ is found. Thus, the combined center of gravity of all eight pistons is at the point 3′—A′ when the crank shaft is in the position indicated. If the crank shaft be moved to the points marked B or 4, the combined center of gravity may be similarly found at 4′—B′ as indicated. Thus the points may be carried around the circle 31 indefinitely, and it will be found that if the resultant points 2′—B′, 3′—A′, etc., are connected a small circle 33 is formed which may be said to be the path of travel of the combined center of gravity of the eight pistons of the motor.

The uneven firing produced by the irregular angular spacing of the cylinders, coupled with the retention of the axes of the crank pins in a plane, which plane passes through the axes of the crank shaft bearings, also prevents the synchronization of the explosive impulses with the natural oscillations of the crank shaft and thus prevents periodic torsional vibration.

Having thus described my invention, what I claim and desire to secure by Letters Patent is:—

1. In a hydrocarbon motor, in combination, a crank case having alined bearings, eight cylinders arranged on said case in sets of four each with the axes of each set lying in a plane at an angle of approximately sixty degrees to the axes of the other set, a piston and connecting rod for each cylinder, and a crank shaft to which all of said rods are connected, said crank shaft being mounted in said alined bearings and having the axes of all its crank pins in a single plane passing through the axes of said bearing.

2. In a hydrocarbon motor, in combination, eight cylinders arranged in two sets of four each with the axes of each set of cylinders in a plane at an angle of sixty degrees to the axes of the other set, pistons for the cylinders, a crank shaft having the axes of all of its crank pins in a plane, and connecting rods from the pistons to the respective crank pins.

3. In a hydrocarbon motor, in combination, eight cylinders arranged in sets of four each with the axes of each set in a plane at an angle of approximately sixty degrees to the axes of the other set, a piston and connecting rod for each cylinder, and a crank shaft for said connecting rods having the axes of all crank pins in a plane.

4. In a hydrocarbon motor, in combination, eight cylinders arranged in sets of four each with the axes of each set in a plane at an angle to the axes of the other set, a piston and connecting rod for each cylinder, and a crank shaft for said connecting rods having the axes of all crank pins in a plane, the angle between the sets of cylinders being such that the combined center of gravity of the pistons moves substantially in a circle as the crank shaft rotates.

In testimony whereof I affix my signature.

JESSE G. VINCENT.